United States Patent
Sang et al.

(10) Patent No.: US 9,813,430 B2
(45) Date of Patent: Nov. 7, 2017

(54) TRACKING DATA IN AN ONLINE ENVIRONMENT

(71) Applicant: LinkedIn Corporation, Mountain View, CA (US)

(72) Inventors: Lifeng Sang, San Jose, CA (US); Daniel Wong, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 288 days.

(21) Appl. No.: 14/739,188

(22) Filed: Jun. 15, 2015

(65) Prior Publication Data

US 2016/0364465 A1 Dec. 15, 2016

(51) Int. Cl.
*G06F 17/30* (2006.01)
*H04L 29/06* (2006.01)

(52) U.S. Cl.
CPC .................. *H04L 63/1408* (2013.01)

(58) Field of Classification Search
None
See application file for complete search history.

(56) References Cited

U.S. PATENT DOCUMENTS

| | | | | |
|---|---|---|---|---|
| 8,381,039 B1* | 2/2013 | Osiecki | ................. | G06F 11/34 714/33 |
| 9,563,531 B2* | 2/2017 | Osiecki | ................. | G06F 11/34 |
| 2006/0059159 A1* | 3/2006 | Truong | ............ | G06F 17/30861 |
| 2009/0019514 A1* | 1/2009 | Hazlewood | ............ | H04L 63/20 726/1 |
| 2012/0109737 A1* | 5/2012 | Setty | .................. | G06Q 30/0242 705/14.41 |
| 2012/0259793 A1* | 10/2012 | Umansky | ............... | G06Q 10/06 705/348 |
| 2012/0304296 A1* | 11/2012 | Shulman | ............ | H04L 63/1433 726/23 |
| 2013/0246633 A1* | 9/2013 | Giesen | .................... | H04L 65/10 709/227 |
| 2013/0275192 A1* | 10/2013 | Aissa | ................. | G06Q 30/0213 705/14.15 |
| 2014/0033074 A1* | 1/2014 | Thibaux | ............ | G06F 17/30867 715/753 |
| 2014/0095412 A1* | 4/2014 | Agashe | .................. | G06Q 50/01 706/12 |
| 2014/0304798 A1* | 10/2014 | Iyengar | ............... | H04L 63/1458 726/11 |
| 2015/0207708 A1* | 7/2015 | Raleigh | .............. | H04L 67/2804 709/217 |

(Continued)

*Primary Examiner* — Hung Le
(74) *Attorney, Agent, or Firm* — Hickman Palermo Becker Bingham LLP

(57) ABSTRACT

To detect potentially malicious behavior or fraud, online environments maintain counts of a variety of data items received via a webpage or an application. A bucket scheme to track and retrieve these counts is described. The bucket system maintains a rolling count over a period of time. The bucket system comprises three different tiers, each containing buckets corresponding to different periods of time. When a new data item is received, one bucket in each tier is updated. The bucket is updated by generating a bucket address and initiating or incrementing a counter counting the number of times the data item was received. To retrieve the count over a specified period of time, the counters in a plurality of the buckets are read and aggregated.

18 Claims, 8 Drawing Sheets

(56) References Cited

U.S. PATENT DOCUMENTS

| | | | |
|---|---|---|---|
| 2015/0295766 A1* | 10/2015 | Dickey | H04L 41/0856 709/221 |
| 2015/0379526 A1* | 12/2015 | Fransen | G06Q 30/0269 708/551 |
| 2016/0148249 A1* | 5/2016 | Marth | G06Q 10/101 705/14.42 |
| 2016/0239785 A1* | 8/2016 | Lassau | G06Q 10/06315 |

* cited by examiner

TRACKING DATA IN AN ONLINE ENVIRONMENT

TECHNICAL FIELD

The present disclosure relates to data processing and, more specifically, to a counting system used to detect fraud and other malicious behavior in an online environment.

BACKGROUND

In online environments like social networking sites, ecommerce sites, and content publishing sites, fraud and other malicious behavior can cause significant problems. While most malicious behavior is unlikely to cause service disruptions or take down a website, some malicious behavior can slow the website by consuming more resources than a typical user of the website. Examples of malicious behavior includes spamming, data scraping, setting up bad accounts, and committing payment fraud. Malicious behavior can be detected in a number of ways, including by monitoring certain calls or actions initiated by users.

Particular types of malicious behavior can be detected by the particular calls made, by the number of calls made, or by data or metadata of the calls. As such, entities that host online environments may use various tools to track certain calls according to one or more characteristics of the calls. The entities can use the data obtained by the tools to analyze traffic or actions of one or more particular users to identify malicious behavior. When malicious behavior is detected, the entity can stop the behavior, mitigate damage caused by the behavior, or take another action in response to the behavior.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
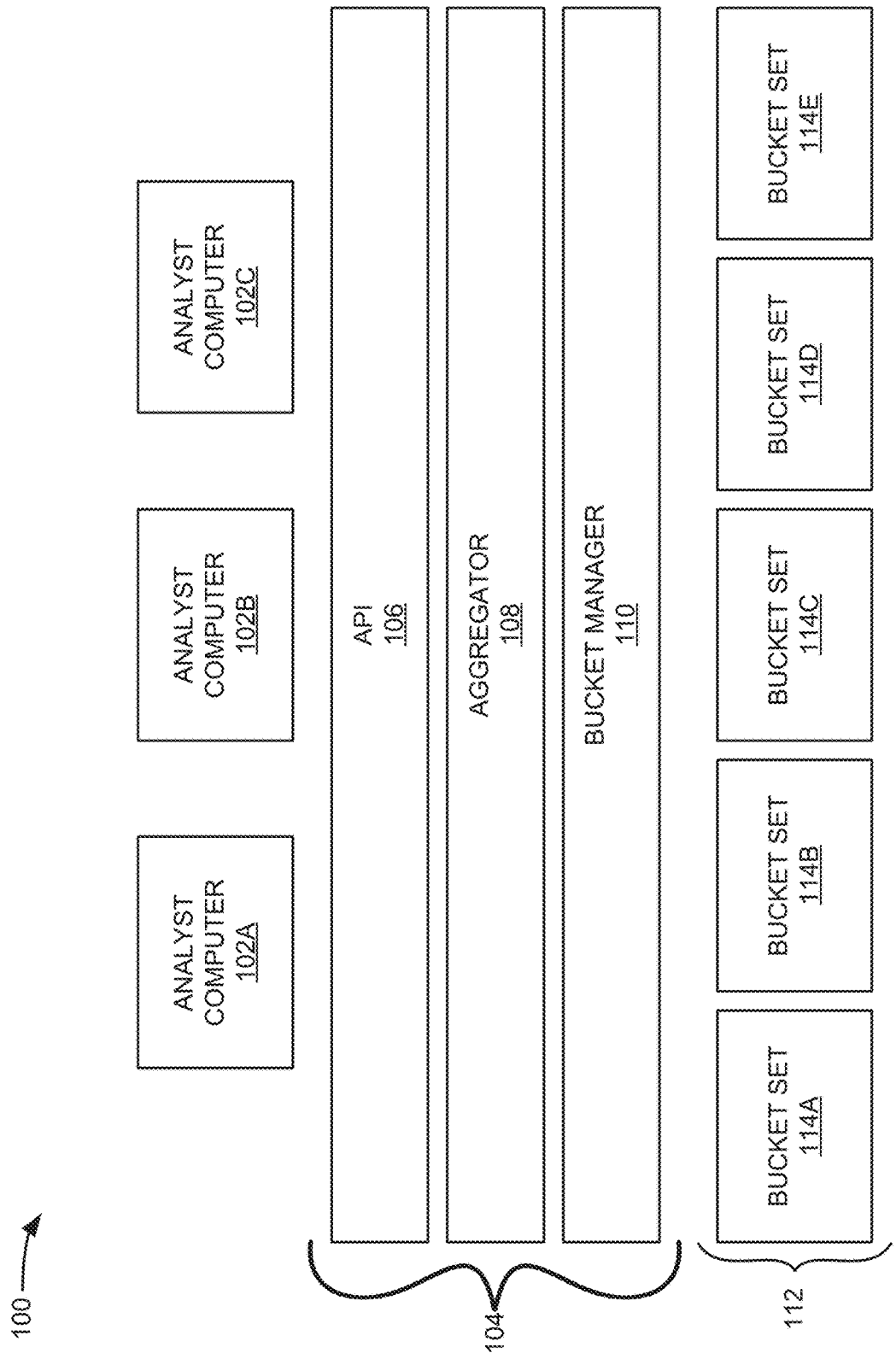
FIG. 1 is a block diagram of a computing system for collecting data in an online environment, according to some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To track instances of data items that may be malicious or that may indicate malicious acts, a bucket scheme is used. Data items are received from one or more users within the online environments. Examples of types data items that may be tracked include, but are not limited to new user registrations, logins, failed login attempts, messages sent, invitations to connect sent, payments made, content items posted. For each type of data item, an identifying characteristic is further used to classify the data item such as, but not limited to, member identifier, cookie information, Internet Protocol (IP) address, Internet Service Provider (ISP), Proxy, and credit card or other payment information.

Within the bucket scheme, for each type of data item and its corresponding identifying characteristic, a bucket set is generated. Within the bucket set, instances of the data item are counted over an extended period of time, such as 24 hours. The bucket set is divided into two or more tiers, and each tier comprises multiple buckets and corresponds to a period of time. Each of the buckets within a tier is assigned to a time range having a start time and an end time. The time range and number of buckets within a tier dictate the time range of the tier. The time range of the tier is equal to a time range of one bucket in the next tier. In alternate embodiments, other time ranges can be used such that the time range of the tier is not equal to a time range of one bucket in the next tier.

Each bucket is associated with a counter indicating a number of occurrences during the time range of the bucket. When a data item is received, keys identifying two or more buckets in a same bucket set are generated. The same bucket set is assigned to the type of data item and its corresponding identifying characteristic. The two or more buckets respectively belong to different tiers within the bucket set.

Because each data item is counted upon receipt in more than one bucket, as each bucket in the tier becomes obsolete, there is no need to combine or synchronize counts in other buckets. Because combination and synchronization can be complex and error-prone, the bucket scheme is more robust and accurate than bucket scheme requiring those tasks. The bucket scheme disclosed herein can improve the detection of malicious behavior and prevention of fraud by providing more accurate data to analysts charged with detecting malicious behavior and preventing fraud.

Further, the bucket scheme used herein can be used for other purposes within the online environment outside of the detection of malicious behavior. For example, some online environments provide an option for users to pay to subscribe to content or to access enhanced features. In some instances, these options are limited to a number of content items or uses of the enhanced features over a limited period of time. For example, a user might be limited to ten articles or 15 queries using enhanced search features every 30 days. These uses can be tracked using the bucket scheme described herein.

System Overview

FIG. 1 is a block diagram of a computing system 100 for collecting data in an online environment, according to some embodiments. The computing system 100 is responsible for tracking receipt of data items within the online environment and reporting counts of the data items to one or more analyst computers. System 100 is a computer-based system. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes one or more analyst computers 102A, 102B, and 102C; a bucket computing device 104 comprising an application program interface (API) 106, aggregator 108, and bucket manager 110; and data storage 112 storing bucket sets 114 A-E.

Analyst computers 102A, 102B, and 102C comprise computing devices, including but not limited to, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of the analyst computers 102A, 102B, and 102C includes applications such as a web browser, software, and/or other executable instructions to facilitate various aspects of the techniques described herein. Analyst computers 102A, 102B, and 102C may also include additional applications or other interface capabilities to communicate with the bucket computing device 104 and/or data storage 112. Analyst computers 102A, 102B, and 102C may, depending on the embodiment, be located geographically dispersed from each other. Although three analyst computers 102A, 102B, and 102C are shown in FIG. 1, more or less than three analyst computers 102A, 102B, and 102C may be included in system 100.

Bucket computing device 104 comprises one or more servers, computers, processors, database servers, and/or computing devices configured to communicate with the data storage 112 and/or analyst computers 102A, 102B, and 102C. Bucket computing device 104 hosts an API 106, aggregator 108, bucket manager 110, or other visual or mechanisms related to techniques and data described in detail below. Bucket computing device 104 may be located at one or more geographically distributed locations. Although one bucket computing device 104 is shown in FIG. 1, system 100 may, depending on the embodiment, comprise one, two, or any number of bucket computing devices 104, which may work alone and/or collectively to provide the functionality described herein.

The bucket computing device 104 hosts an API 106. The API 106 provides an interface via which the analyst computers 102A-C can retrieve data from the data storage 112. In some embodiments, the API 106 comprises a C++, Java, or JSON API.

The bucket computing device 104 hosts an aggregator 108. When responding to a request from the analyst computer 102A, the aggregator 108 is configured to aggregate counts retrieved from individual buckets and individual bucket sets. As described herein, a bucket set is created for each type of data item and an identifying characteristic. To illustrate, an example of a type of data item is a login attempt. An example of an identifying characteristic is a user identifier. Thus, a different bucket set is created for each user identifier that attempts a login. When the online environment has millions of users logging in each day, one bucket set is created for each user of the millions of users who have attempted a login in the previous 24 hours. Thus, just for the type of data item "login attempts", millions of bucket sets exist. A request from the analyst computer 102A may request data contained within thousands of buckets spread over hundreds of bucket sets. The aggregator 108 aggregates the counts within the thousands of buckets to fulfill the request. Alternatively, the request from the analyst computer 102A may request data for a single user and, thus, aggregator 108 aggregates the counts within a subset of the buckets of a single bucket set.

In a related example, a type of data item is a login attempt and an identifying characteristic is an IP address. Thus, a different bucket set is created for each IP address that is associated with an attempt to login. Although the online environment has millions of users logging in each day, one bucket set is created for each distinct IP address, which may be shared by many users who have attempted a login in the previous 24 hours. A request from the analyst computer 102B may request data about three particular IP addresses and, thus, three different bucket sets are analyzed. The aggregator 108 aggregates the counts within buckets to of the three bucket sets to fulfill the request.

The bucket manager 110 is configured to manage the buckets within the bucket sets 114A-E stored in data storage 112. The bucket manager 110 generates two or more keys for each received data item based on a timestamp indicating when the data item was received, the type of data item, and identifying characteristic of the data item. The bucket manager 110 can hash the generated keys and update a counter associated with each key. When responding to requests received from the analyst computer 102A, the bucket manager 110 generates two or more keys for the request based on the type(s) of data item being requested, identifying characteristics included in the request, and a time range included in the request. The bucket manager 110 can hash the generated keys and read a counter associated with each key.

Data storage 112 comprises one or more databases or storage devices configured to store and maintain bucket sets 114A-E, user profiles, data associated with user profiles, data associated with use of or access to user profiles, data derived from user profiles, and/or instructions for use by bucket computing device 104 and/or analyst computers 102A-C as described herein. Data storage 112 may, in some embodiments, be located at one or more geographically distributed locations relative to bucket computing device 104. Bucket computing device 104 and/or analyst computers 102A-C may, in some embodiments, access data storage 112 via a network (not depicted). Alternatively, bucket computing device 104 may access data storage 112 without use of a network. As another alternative, data storage 112 may be included within bucket computing device 104. System 100 may, depending on the embodiment, comprise one, two, or any number of data storages 112 configured to individually and/or collectively store the data described herein.

Bucket Set Overview

Figure 2:
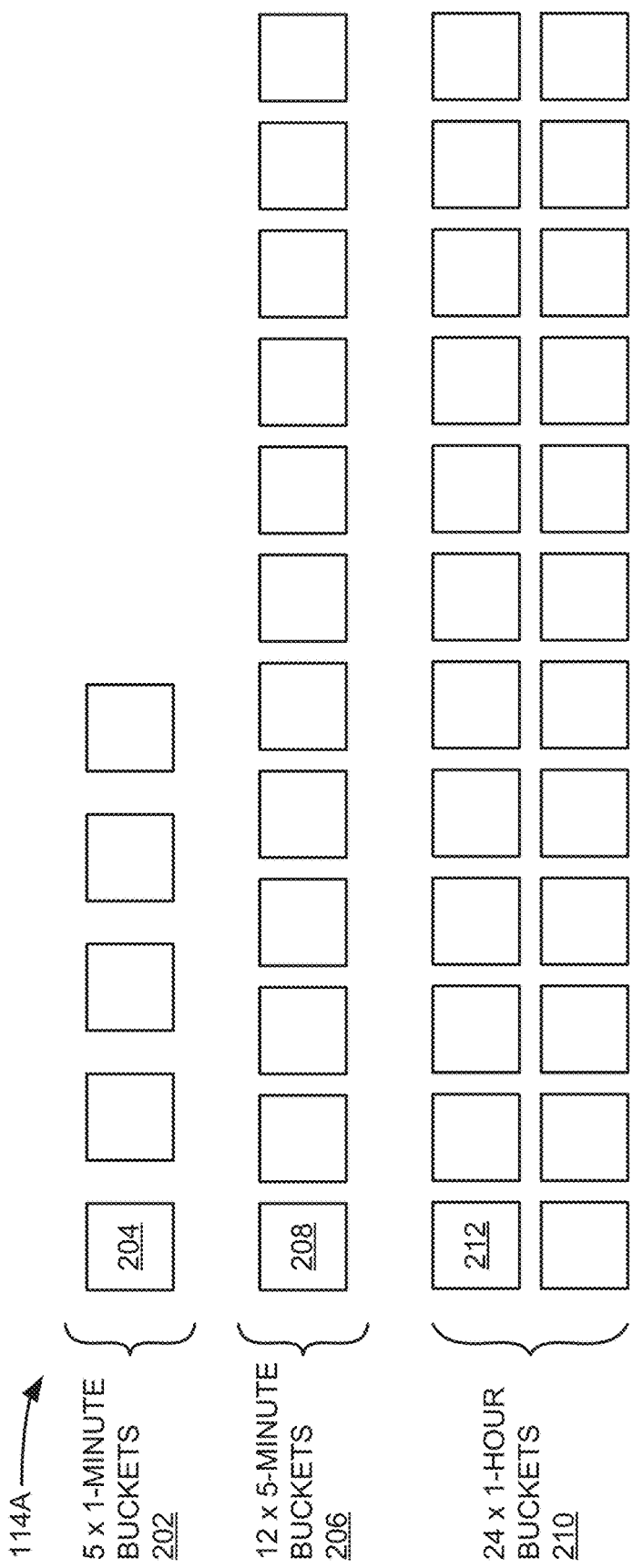
FIG. 2 depicts a bucket set for tracking receipt of a particular data item, according to some embodiments.

FIG. 2 depicts a bucket set 114A for tracking occurrences of a particular data item, according to some embodiments. As depicted in FIG. 2, the bucket set 114A is empty. An empty bucket set 114A may comprise counters that are each set to 0. In other embodiments, the counters are created when a data item is received, when it is set to 1.

The bucket set 114A comprises three tiers: 1-minute tier 202, 5-minute tier 206, and 1-hour tier 210. Each tier comprises enough buckets to equal a period of time associated with a bucket in the next tier. As depicted, the 1-minute tier 202 contains five buckets, having a tier time range of five minutes, which is the time range of a bucket 208 in the 5-minute tier 206. The 5-minute tier 206 contains twelve buckets, having a tier time range of 60 minutes, which is the time range of a bucket 208 in the 1-hour tier 210. The 1-hour tier 210 contains twenty-four buckets, having a tier time range of 24 hours, which is the time range of the entire bucket set. Other embodiments can include more or fewer tiers, each corresponding to different lengths of time. For example, to extend the time range of the bucket set to one week, a fourth tier comprising seven 1-day buckets can be added, or to extend the time range of the bucket set to one month, a fourth tier comprising 28-31 1-day buckets can be added. To increase the granularity of the data collected to 1 second rather than 1 minute, a zero tier comprising sixty 1-second buckets can be added.

The 1-minute tier 202 comprises up to five 1-minute buckets, including 1-minute bucket 204. Each 1-minute bucket corresponds to a time range having a period of one minute. The one-minute bucket 204 corresponds to the present minute. The adjacent 1-minute bucket corresponds to a most recently elapsed minute beginning at, for example, time "hour:minute:00.000" and ending at time "hour:minute:59.999".

The 5-minute tier 206 comprises up to twelve 5-minute buckets, including 5-minute bucket 208. Each 5-minute bucket corresponds to a time range having a period of five minutes. The five-minute bucket 208 corresponds to the present five minute interval. The adjacent 5-minute bucket corresponds to a most recently elapsed five minute interval beginning at, for example, time "hour:5:00.000" and ending at time "hour:9:59.999".

The 1-hour tier 210 comprises up to twenty-four 1-hour buckets, including 1-hour bucket 212. Each 1-hour bucket corresponds to a time range having a period of one hour, or sixty minutes. The 1-hour bucket 208 corresponds to the present hour long interval. The adjacent 1-hour bucket corresponds to a most recently elapsed one hour interval beginning at, for example, time "day:1:00:00.000" and ending at time "day:1:59.999".

The bucket set 114A is a rolling bucket set, meaning that only the most recent 24-hour data is kept. Once data is 24 hours old, it is no longer maintained. For each new 1-minute, 5-minute, or 1-hour interval that elapses, the oldest bucket in the tier is released, and a new bucket is generated.

Because the bucket set 114A is rolling, it is optimized for responding to read commands where the request is of the type "how many data items have been received in the most recent 'hour:minutes'?" Because online environments can generate millions of queries per second of the data stored in the data buckets, being able to efficiently respond to requests is paramount. To maintain read-write consistency of the buckets, when a bucket is created or updated, the bucket is locked and cannot be read. When the bucket is not being written to, more than one thread can read simultaneously from the bucket.

Write Method Overview

Figure 3:
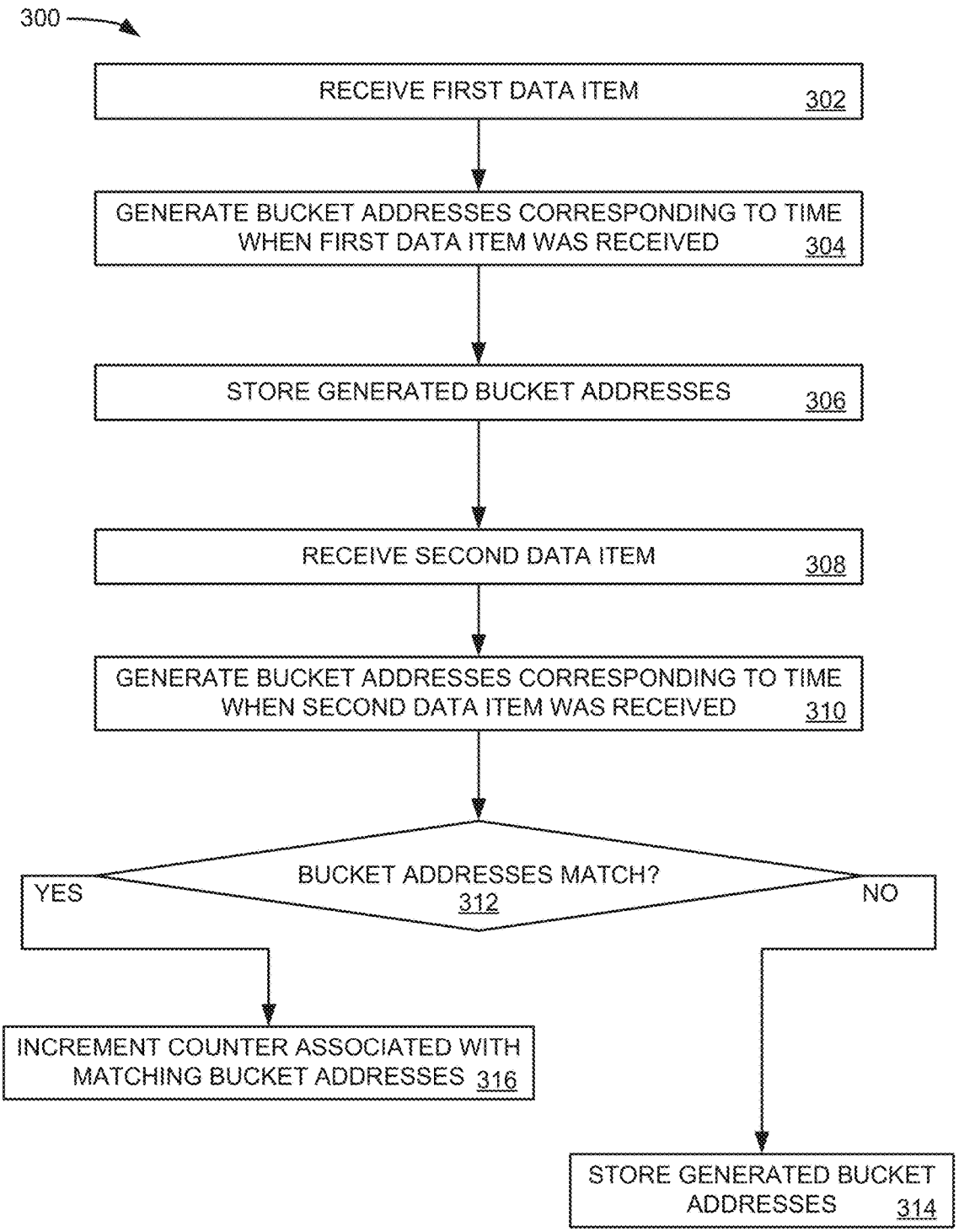
FIG. 3 is a flowchart of a method of tracking occurrences of a particular data item, according to some embodiments.

FIG. 3 is a flowchart of a method 300 of tracking receipt of a particular data item, according to some embodiments. The method 300 is performed by the bucket manager 110 to generate buckets within bucket sets and associated counters. The method 300 assumes that the bucket sets 114A-E are not statically stored in the data storage 112, rather the buckets are created as needed upon receipt of a data item. The bucket and counter are stored in the data storage 112 as a key-value pair, where the key is a bucket address that identifies bucket set 114A and a bucket within the bucket set 114A, and where the value comprises the counter corresponding to the bucket.

In an operation 302, the bucket manager 110 receives a first data item within the online environment. The first data item is identified by a type of data item and one or more identifying characteristics of the data item. The first data item can include, or be associated with, a first timestamp indicating a time at which the data item was received. In some embodiments, the timestamp is accurate to the millisecond (ms).

In an operation 304, the bucket manager 110 generates two or more bucket addresses, also referred to as keys, of buckets in the bucket set that correspond to the time when the first data item was received. The bucket addresses are generated from the type of data item, the one or more identifying characteristics of the data item, and the timestamp. In some embodiments, the each key is of the form:

Type_Characteristic_Time where "Type" identifies the type of data item, "Characteristic" identifies the identifying characteristic, and "Time" is a numerical value calculated from the time stamp. "Time" is a string converted from a long value that, unlike a floating value, only have the integer portion of the calculations below. Time can be calculated as a long value using the formulas:

Time(1-minute bucket)=timestamp/(60 second per minute*1000 ms per second)

Time(5-minute bucket)=timestamp/(5 minutes*60 second per minute*1000 ms per second)

Time(1-hour bucket)=timestamp/(60 minutes*60 second per minute*1000 ms per second)

For example, if two data items are received 50 ms apart, the "Time" value will be the same because the division returns only the integer part instead of a floating value if both the nominator and denominator are integers (or longs). The keys, once calculated, may be hashed using a hashing function, such as a Secure Hash Algorithm (SHA) like SHA-1. Alternatively, the keys are stored without hashing or other alteration.

Figure 4:
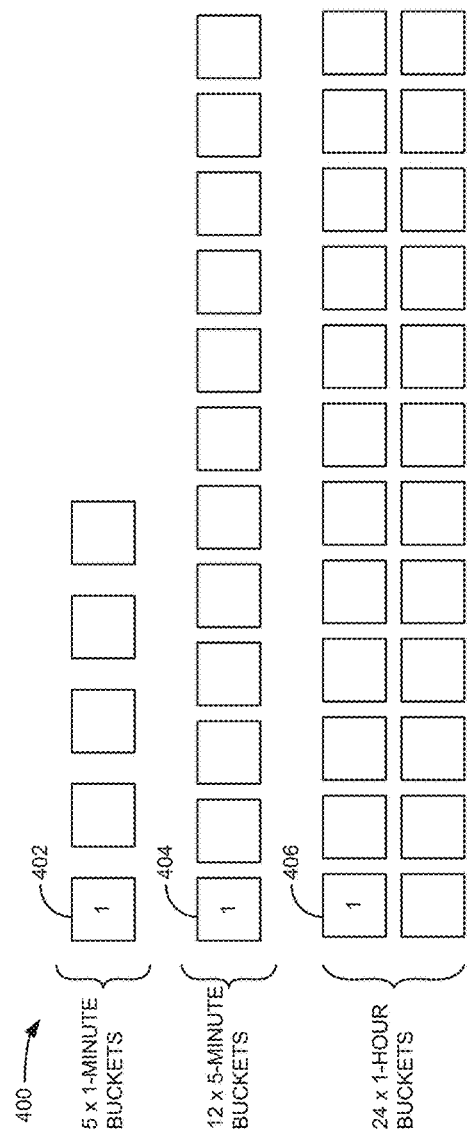
FIG. 4 depicts a bucket set after logging a first occurrence, according to some embodiments.

In an operation 306, the generated bucket addresses are stored in data storage 112. To record the receipt of the first data item, the counters in each of the three buckets corresponding to the three generated keys are set to 1. FIG. 4 depicts the bucket set 400 after logging a first data item, according to some embodiments. As depicted, counters in each of buckets 402, 404, and 406 that correspond to the timestamp of the data item, are set to 1.

Returning to FIG. 3, in an operation 308, a second data item is received as described in connection with operation 302. In an operation 310, the bucket addresses are generated as described in connection with operation 304.

In an operation 312, a determination is made as to whether at least one of the bucket addresses generated in operations 304 and 310 matches an existing bucket address. Because all six addresses are compared, it is likely that only 1 pair or 2 pairs of the six addresses will match. For any bucket address generated in operation 310 that does not match any of the bucket addresses stored in operation 306, the method 300 proceeds to operation 314. In operation 314, such bucket addresses are stored as described in connection with operation 306.

Figure 5:
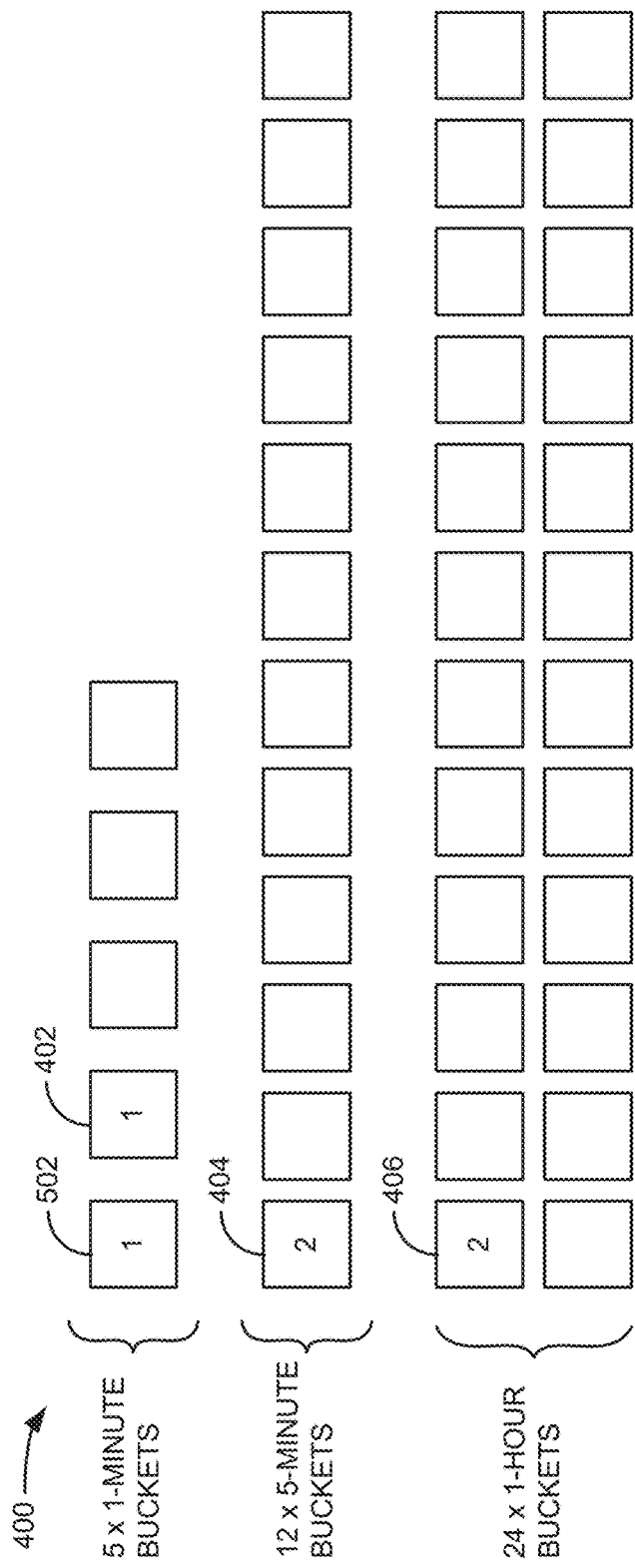
FIG. 5 depicts the bucket set after logging a second occurrence, according to some embodiments.

For the bucket addresses that match, in an operation 316, the counter (or value in the key-value pair) is incremented to reflect the receipt of the second data item. FIG. 5 depicts the bucket set 114A after logging a second occurrence occurring in a second 1-minute time range that is after the first 1-minute time range, according to some embodiments. As depicted, bucket 402 is logically shifted one bucket to the right in the first tier, reflecting the passage of one minute, and new bucket 502 is added with a counter of 1. The counter in each of buckets 404 and 406 is incremented by one, indicating that the second data item was received during the same five minute interval and one hour interval, respectively.

For each subsequent data item, operations 308-314 are repeated.

Read Method Overview

Figure 6:
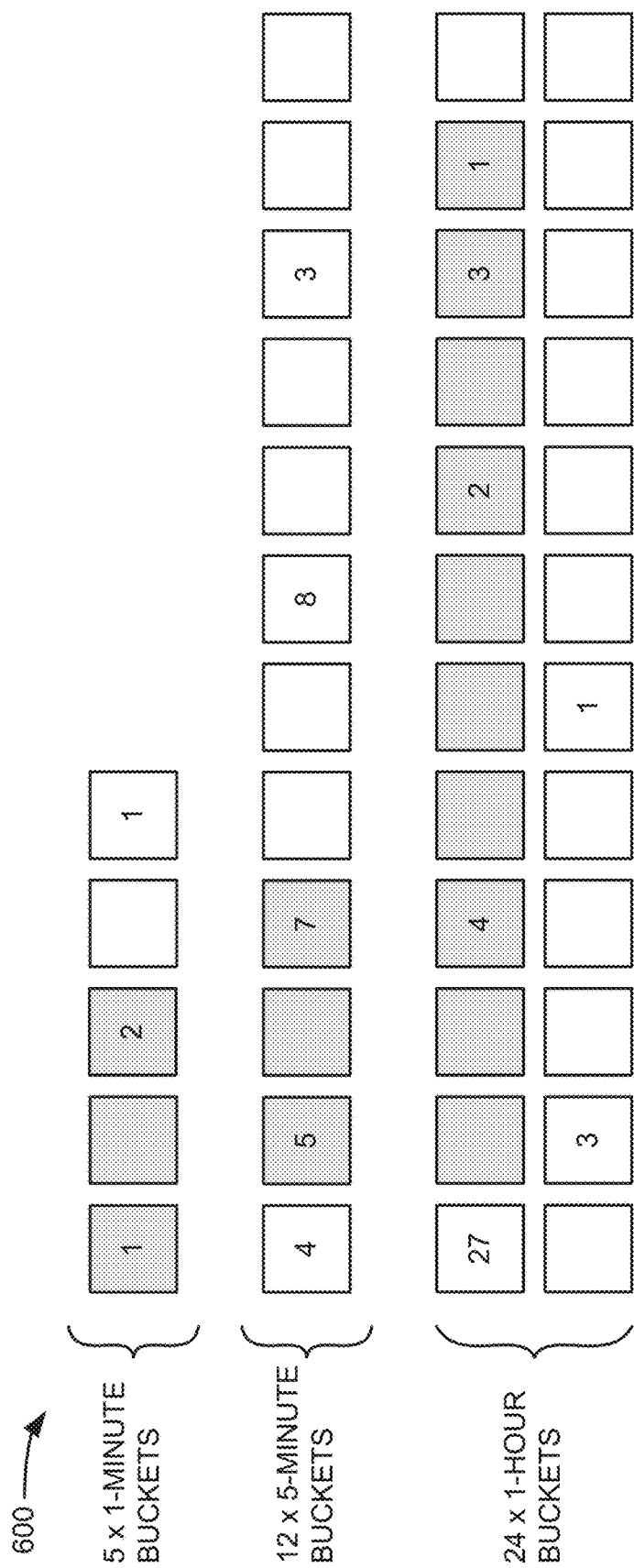
FIG. 6 depicts a bucket set after an elapsed period of time, according to some embodiments.

FIG. 6 depicts a bucket set 600 after an elapsed period of time of 24 hours or less, according to some embodiments. As depicted, some buckets in the bucket set have counters, meaning that at least one data item was received during the corresponding time range. The buckets without counters can exist only conceptually because no key was generated or stored for them. In other words, no memory is used to store "empty" buckets.

Figure 7:
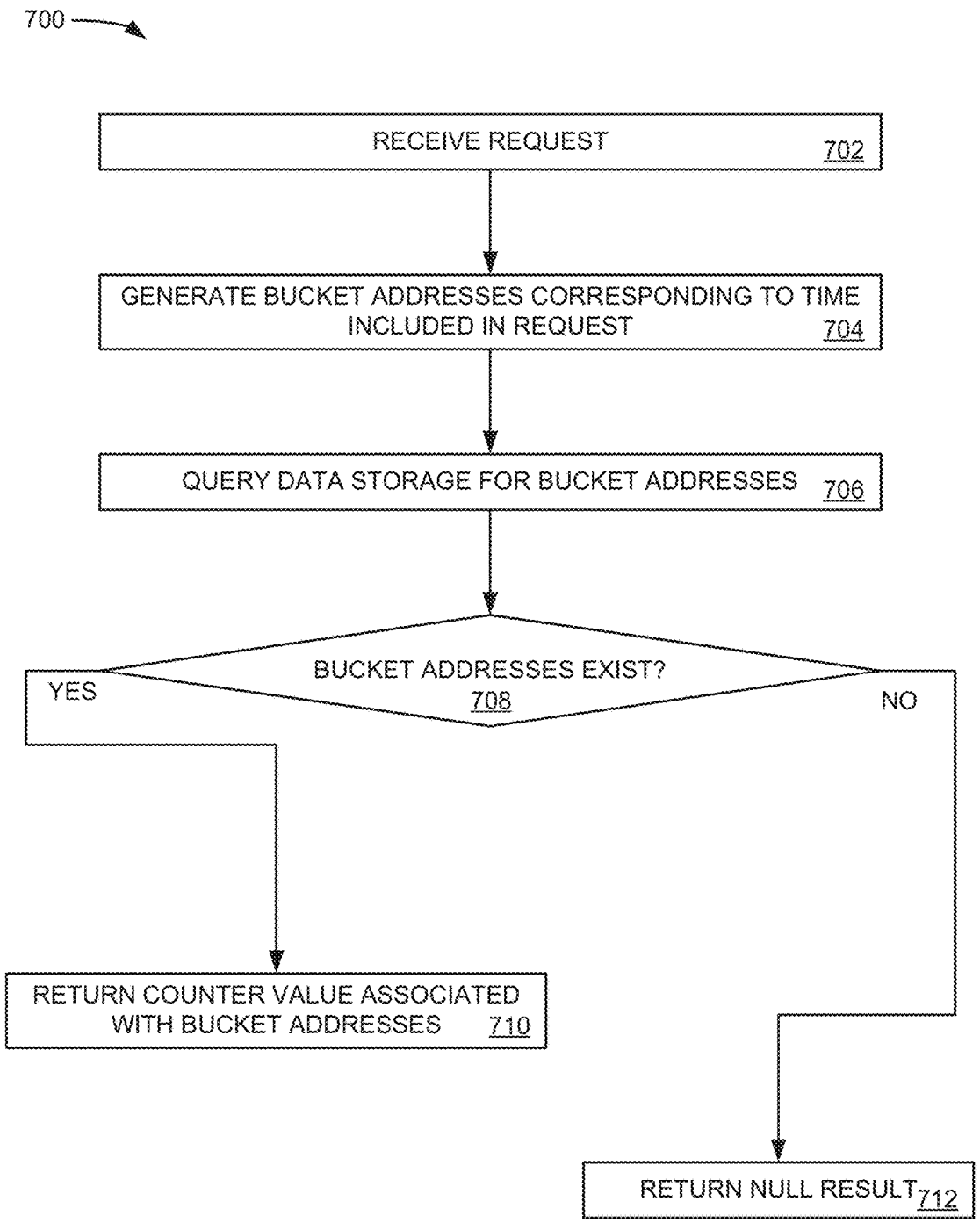
FIG. 7 is a flowchart of a method for processing a request for values from the bucket set, according to some embodiments.

FIG. 7 is a flowchart of a method 700 for processing a request for values from the bucket set. The method 700 is performed by the bucket manager 110 in the bucket computing device 104. Before the method 700 is performed, a request is received from the analyst computer 102A at the API 106. The API 106 passes the request to the aggregator 108. The aggregator 108 can reformat the request such that the bucket manager 110 is able to identify relevant bucket sets and buckets within the bucket sets. The aggregator can also instruct the bucket manager 110 to retrieve values over a specified period of time, starting at a specified time in the past and ending at the current time.

Before the method 700 is performed, the aggregator 108 identifies the buckets and bucket sets to be read in order to process the request. The bucket sets containing the buckets are selected set based on the type of data item and/or its identifying characteristic, since there could be millions of bucket sets in the data storage 112.

In an operation 702, the request is received at the bucket manager 110 from the aggregator 108. The request for each bucket set being read to process the request may be of the form "how many data items with a particular value were received in the most recent hours:minutes?".

In some embodiments, the bucket computing device 104 provides interfaces to the analyst computer 102A that allows analyst to request aggregated counts for a most recent number of buckets with a given tier. For example, the analyst can request bucket counts within a single tier such as: the total count for the last 12 buckets in the 1-hour tier (e.g., tier 210), the total count for the last 6 buckets of the 5-minute tier (e.g., tier 206), or the total count for the last 3 buckets of the 1-minute tier (e.g., tier 202).

In an operation 704, the bucket manager 110 generates bucket addresses corresponding to the period time included in the request. The bucket addresses are generated as described in connection with operation 304. When reading, more than three addresses are generated so that the entire time is covered.

In some embodiments, the API 106 allows the user to request "the aggregated count for the last X minutes", where $X \leq 24*60$, if the bucket set stores up to 24 hours of counts (this number can change if the system supports weekly, monthly or yearly counters). To fulfill the request the bucket manager 112 reads from: X/60 buckets of the 1-hour tier 210, excluding the most recent bucket; (X−(X/60)*60)/5 buckets of the 5-minute tier 206, excluding the most recent bucket; and X % 5 buckets of the 1-minute tier 202, including the most recent one, where the % operator instructs that a modulo operation be performed. When the buckets have been identified, the bucket manager 112 uses the current time to compute the key as discussed in connection with operation 304 and excludes the most recent buckets in tiers 206 and 210.

Referring back to FIG. 6, if a request for the number of data items received in the most recent 10 hours, 18 minutes is received, a plurality of bucket addresses are generated. As depicted by the shaded buckets in FIG. 6, bucket addresses for ten 1-hour buckets, three 5-minute buckets, and the 1-minute buckets are determined. To avoid counting the most recent data items two or three times or to counting data items received outside of the scope of the request, the most recent 1-hour and 5-minute buckets are excluded.

In this example, the division operator in the formula used to calculate "Time" in the bucket address returns integer values instead of a floating value. For retrieving data from the previous 10 hours and 18 minutes, the X value is 618, resulting in the calculations:

$$618/60=10 \text{ buckets of the 1-hour tier 210, excluding the most recent bucket} \quad (1)$$

$$(618-(618/60)*60)/5=3 \text{ buckets of the 5-minute tier 206, excluding the most recent bucket} \quad (2)$$

$$618\%5=3 \text{ buckets of the 1-minute tier 202, including the most recent bucket} \quad (3)$$

Returning to FIG. 7, in an operation 706, the bucket manager 110 queries the data storage 112 for the generated bucket addresses.

In an operation 708, for each generated bucket address of operation 704, a determination is made as to whether the bucket address exists. As can be seen in FIG. 6, some of the addresses may refer to empty buckets that were not created. In an operation 712, for the non-existent buckets, a null result is returned to the aggregator 108.

In an operation 710, for the portion of the bucket addresses that exist, the value of the counter of the bucket is returned to the aggregator 108. The aggregator 108 can then aggregate the results returned from each bucket in the bucket set and from each bucket set identified in the request received via the API 106 to provide a desired result to the analyst computer 102A.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
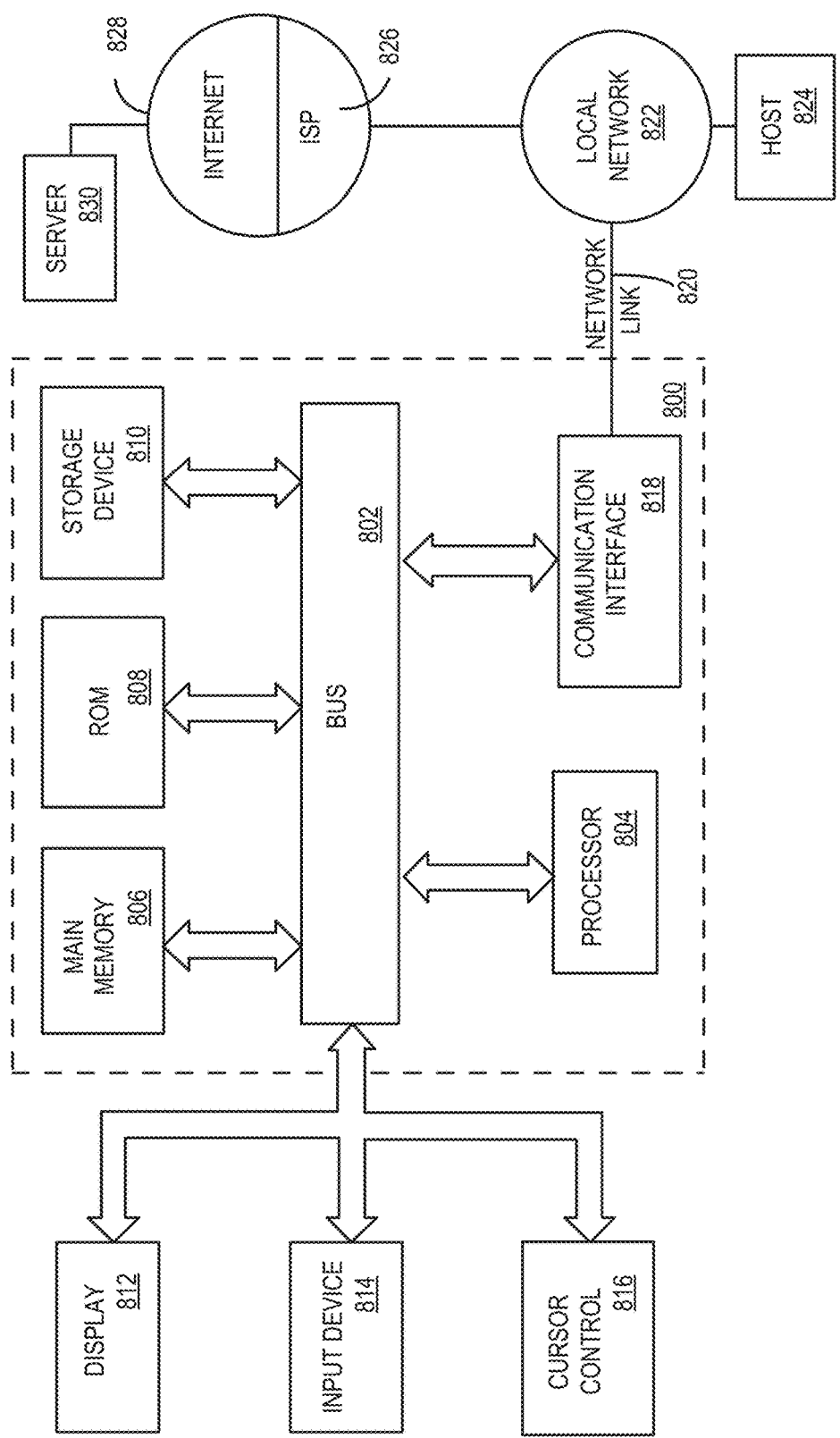
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a first data item;
   in response to receiving the first data item, generating a first plurality of values, wherein each value of the first plurality of values is associated with a first time and a different time range of a plurality of time ranges;
   storing the first plurality of values;
   receiving a second data item;
   in response to receiving the second data item, generating a second plurality of values, wherein each value of the second plurality of values is associated with a second time and a different time range of the plurality of time ranges;
   determining that a second value in the second plurality of values is identical to a first value in the first plurality of values;
   in response to determining that the second value is identical to the first value, incrementing a counter that is associated with the first value;
   wherein the first plurality of values respectively represent a plurality of buckets;
   wherein the method is performed by one or more computing devices.

2. The method of claim 1, wherein a first bucket of the plurality of buckets corresponds to a first time range, a second bucket of the plurality of buckets corresponds to a second time range that is longer than the first time range, and a third bucket of the plurality of buckets corresponds to a third time range that is longer than the second time range.

3. The method of claim 2, further comprising determining that a period of time corresponding to the second time range has elapsed and, in response, setting the counter associated with the first value to zero.

4. The method of claim 2, further comprising determining that a period of time corresponding to the third time range has elapsed and, in response, setting a counter associated with a third value of the first plurality of values corresponding to the second time range to zero.

5. The method of claim 1, further comprising:
   receiving a request for the counter that is associated with the first value;
   generating the first value based on a current time;
   retrieving the counter that is associated with the first value.

6. The method of claim 1, wherein the first plurality of values are generated using a hash function based on a current time when the first data item was received.

7. The method of claim 1, wherein the data item is associated with a type of data item.

8. The method of claim 1, wherein the data item is associated with an identifying characteristic.

9. The method of claim 1, wherein the plurality of time ranges comprise a 1-minute time range, a 5-minute time range, and a 1-hour time range.

10. A data processing system comprising:
    one or more processors;
    a non-transitory computer-readable medium having instructions embodied thereon, the instructions, when executed by one or more processors, cause performance of:
      receiving a first data item;
      in response to receiving the first data item, generating a first plurality of values, wherein each value of the first plurality of values is associated with a first time and a different time range of a plurality of time ranges;
      storing the first plurality of values;
      receiving a second data item;
      in response to receiving the second data item, generating a second plurality of values, wherein each value of the second plurality of values is associated with a second time and a different time range of the plurality of time ranges;
      determining that a second value in the second plurality of values is identical to a first value in the first plurality of values;
      in response to determining that the second value is identical to the first value, incrementing a counter that is associated with the first value;
      wherein the first plurality of values respectively represent a plurality of buckets.

11. The system of claim 10, wherein a first bucket of the plurality of buckets corresponds to a first time range, a second bucket of the plurality of buckets corresponds to a second time range that is longer than the first time range, and a third bucket of the plurality of buckets corresponds to a third time range that is longer than the second time range.

12. The system of claim 11, wherein the instructions further cause performance of determining that a period of time corresponding to the second time range has elapsed and, in response, setting the counter associated with the first value to zero.

13. The system of claim 11, wherein the instructions further cause performance of determining that a period of time corresponding to the third time range has elapsed and, in response, setting a counter associated with a third value of the first plurality of values corresponding to the second time range to zero.

14. The system of claim 10, wherein the instructions further cause performance of:
    receiving a request for the counter that is associated with the first value;
    generating the first value based on a current time;
    retrieving the counter that is associated with the first value.

15. The system of claim 10, wherein the first plurality of values are generated using a hash function based on a current time when the first data item was received.

16. The system of claim 10, wherein the data item is associated with a type of data item.

17. The system of claim 10, wherein the data item is associated with an identifying characteristic.

18. The system of claim 10, wherein the plurality of time ranges comprise a 1-minute time range, a 5-minute time range, and a 1-hour time range.

* * * * *